United States Patent [19]
Kuzuya et al.

[11] Patent Number: 5,475,620
[45] Date of Patent: Dec. 12, 1995

[54] ULTRASONIC MEASURING SYSTEM

[75] Inventors: Keiji Kuzuya, Kariya; Naoji Nakahara, Nagoya; Yasuyuki Aoki, Owariasahi, all of Japan

[73] Assignee: Aisin Seiki Kabushiki Kaisha, Kariya, Japan

[21] Appl. No.: 248,730

[22] Filed: May 25, 1994

[30] Foreign Application Priority Data

May 25, 1993 [JP] Japan ............... 5-122987

[51] Int. Cl.⁶ ............................. G01P 15/16
[52] U.S. Cl. ................. 364/565; 367/91; 180/167; 180/170; 324/175; 73/510
[58] Field of Search ............... 364/565, 431.07, 364/426.04; 73/488, 170.13, 510; 324/175, 160; 367/89, 91–117; 342/104; 180/167, 170

[56] References Cited

U.S. PATENT DOCUMENTS 4,248,085  2/1981  Coulthard ................ 73/861.06

FOREIGN PATENT DOCUMENTS 57-68574   4/1982  Japan .
58-39971   8/1983  Japan .
59-203973  6/1984  Japan .
269388     8/1991  Japan .

*Primary Examiner*—Ellis B. Ramirez
*Assistant Examiner*—Thomas Peeso
*Attorney, Agent, or Firm*—Sughrue, Mion, Zinn, Macpeak & Seas

[57] ABSTRACT

An ultrasonic measuring system for a vehicle is composed of first and second ultrasonic transducing assemblies TR1 and TR2. Each transducing assembly TR1, TR2 has three ultrasonic transducers TR11, TR12, TR13, TR21, TR22, TR23 which are separated from each other at an angle of 120 degrees in a horizontal plane about axis disposed at a front and a rear of the vehicle, respectively. Each transducer transmits ultrasonic waves to a road surface at a predefined down-angle relative to the road surface and receives reflected waves from the road surface. Each of the transducers TR21, TR22, TR23 transmits ultrasonic waves to the road surface and receiving reflected waves from the road surface in an opposite direction to a corresponding one of the transducers TR11, TR12, TR13. A two dimensional speed, a yaw rate and a yawing center are obtained by differences of first three speed vectors in three directions obtained by the first ultrasonic transducing assembly TR1 and second three speed vectors in second three directions, corresponding to the first three directions, obtained by the second ultrasonic transducing assembly TR2.

8 Claims, 13 Drawing Sheets

ULTRASONIC MEASURING SYSTEM

BACKGROUND OF THE INVENTION

1. Field of the Invention

This invention relates to a measuring system that utilizes a variety of velocity related information, more particularly, to an ultrasonic measuring system for automotive use. The measuring system may be applied to a navigation system speed detecting system, side slip preventing system, antilock brake system, suspension system, centrifugal force detecting system, yawing center or yaw rate detecting system, and the like.

2. Description of Related Art

Japanese Utility Model Publication (Kokai) No. 57-68574 discloses an ultrasonic speed measuring system. In this technique, a transmitter is separately provided to successively send ultrasonic waves. The waves are reflected to a reflector and successively go into a receiver. Then, frequency is measured by a difference between the transmitted waves and the received waves. This technique is well-known to those skilled in the art.

Japanese Patent Publication (Kokai) No. 59-203973 discloses another ultrasonic speed measuring system. In this technique, one transmitter and two receivers are separately arranged as in the above mentioned technique. Particularly, these two receivers alleviate error due to pitching, nose-up or nose-down of a car body.

Japanese Patent Publication (Kokai) No. 58-39971 also discloses an ultrasonic speed measuring system. In this technique, ultrasonic waves are transmitted in pulse form. A receiving gate corresponding to pulse width is opened when the reflected waves are received. Then, the time period of a predetermined number of received waves is measured to obtain an amount of Doppler shift, thereby metering a car speed.

Japanese Patent Publication (Kokai) No. 3-269388 discloses still another ultrasonic speed measuring system.

In this technique, a transducer radiates ultrasonic waves toward a road surface in front of or at the back of a car at a pre-defined down-angle therefrom. It is measured how long the wave takes to travel from the transducer to a protrusion of the road, on the basis of the radiated waves and input signals of the waves reflected from the protrusion. Moreover, the signal level of the reflected waves is compared with a predetermined threshold so as to detect presence of the protrusion or the like on the road in front of the car and its size. Furthermore, a current car height is measured on the basis of a radiating angle of the waves and a linear distance in the time when the reflected waves come back from the road surface thereby measuring a current speed on the basis of thus obtained Doppler frequency.

FIG. 13 is an explanatory drawing illustrating a fundamental theory of the operation of an ultrasonic measuring system that uses one ultrasonic transducer TR for transmitting and receiving the waves. In the figure:

$$L=H/\sin \phi \quad (1)$$

wherein: L[m] is a distance from the transducer to the road surface, H[m] is a height of the transducer, and $\phi$ [degree] is a radiating angle of the waves from the transducer.

Loss LOSS attributable to a propagation distance at that time is:

$$\text{LOSS}=\text{(diffusion loss)}+\text{(propagation loss)}=20\cdot\text{LOG}(2\cdot L)+2\cdot L\cdot\alpha \quad [\text{dB}] \quad (2)$$

wherein: $\alpha$ is an attenuation constant.
For instance:

$\alpha$ 100 KHz=2.1 [dB/m]

$\alpha$ 200 KHz=8.5 [dB/m]

In case ultrasonic wave beam width ($\phi$ degree) is narrowed, in the transmitted waves, their energy is more intensive thereby increasing signal components S. In the received waves, their signal-to-noise ratio (S/N) is improved for isotropic noises.

Gain G of the transmitted and received waves in total is:

$$G=\text{(transmitted wave gain)}\times\text{(received wave gain)}=\{10\cdot\log(\gamma/\theta^2)\}\times 2 \quad (3)$$

wherein: $\gamma=3.4\times 10^4$ (in case the beam is rotationally symmetric).

In FIG. 9, ultrasonic waves of a frequency f [Hz] are intermittently radiated to the road surface and Doppler frequency df [Hz] is calculated from the received wave frequency $f_o$ ($f_o=f-df$ [HZ]):

$$df=2f\cdot V\cdot\cos\phi/C \quad [Hz] \quad (4)$$

wherein: V is a car speed [Km/h], and
C is a sound velocity [m/s].

Specifically, in the above technique, the ultrasonic waves are radiated from the car toward the frontward direction and the rearward direction at the same radiation angle, and the Doppler frequency of the received signals of the reflected waves of each direction is measured. Then, a Doppler frequency of a difference between the Doppler frequencies of the frontward waves and the rearward waves is calculated so as to obtain a car speed in which a vertical speed component of a car body is canceled. A current car height is obtained from a measurement of the vertical speed component.

Thus, the measuring system detects the protrusion of the road in front of the vehicle at the time of running, utilizing the ultrasonic waves, and measures the car height and the car speed.

As described above, one of the conventional systems obtains the car height on the basis of the linear distance in the time of the reflected waves returning from the road surface and the radiation angle of the waves, thereafter calculating the car speed on the basis of thus obtained Doppler frequency. Another conventional system radiates the ultrasonic waves ahead and behind of the car at the same radiation angle so as to detect the Doppler frequencies, respectively, thereafter calculating the Doppler frequency of their differences and obtaining the car speed in which the vertical component of the car body is canceled.

However, such ultrasonic measuring apparatuses which measure the car movement using the ultrasonic waves have limited uses such as measurements for the car speed, car height and the like while they measure the speed component. Moreover, in case of radiating the ultrasonic waves ahead and behind of the vehicle, the use thereof is limited to detection of the vehicle speed, and such a technique does not provide additional utility to those of the first mentioned technique.

SUMMARY OF THE INVENTION

In view of the above, it is an object of the invention to provide an ultrasonic measuring apparatus that is capable of computing a vehicle state from a two dimensional speed by use of ultrasonic waves, lessen influences of vehicle height change due to vertical vibrations or nose-up and nose-down movements of the vehicle, and measure a yawing center or a rotating movement like a yaw rate of the vehicle.

In accordance with one preferred mode of the invention, there is provided an ultrasonic measuring apparatus for a vehicle comprising: a first ultrasonic transducing means including three first ultrasonic transducers separated from each other at an angle of 120 degrees in a horizontal plane about a first predetermined axis disposed at a front of the vehicle, each first transducer transmitting ultrasonic waves to a road surface at a predefined down-angle relative to the road surface and receiving reflected waves from the road surface; a second ultrasonic transducing means including three second ultrasonic transducers separated from each other at an angle of 120 degrees in a horizontal plane about a second predetermined axis disposed at a rear of the vehicle, each second transducer transmitting ultrasonic waves to the road surface and receiving reflected waves from the road surface in an opposite direction to a corresponding one of the first transducers of the first transducing means; and a computing means for computing a two dimensional speed by synthesizing three first speed vectors in three first directions obtained by the first ultrasonic transducing means and three second speed vectors in three second directions, corresponding to the first three directions, obtained by the second ultrasonic transducing means.

There is also provided an ultrasonic measuring apparatus for a vehicle comprising: an ultrasonic transducing means including four ultrasonic transducers separated from each other at an angle of 90 degrees in a horizontal plane about a predetermined axis disposed at a predetermined position of the vehicle, each transducer transmitting ultrasonic waves to a road surface at a predefined down-angle relative to the road surface and receiving reflected waves from the road surface; and a computing means for computing a two dimensional speed by a difference in speed vectors in two directions obtained by two of the transducers separated at an angle of 180 degrees among the four ultrasonic transducers.

Further objects and advantages of the invention will be apparent from the following description, wherein preferred embodiments of the invention are clearly shown.

BRIEF DESCRIPTION OF THE DRAWINGS

The subject matter which is regarded as the invention is set forth in the appended claims. The invention itself, however, together with further objects and advantages thereof, may be better seen in reference to the following description taken in connection with the accompanying drawings, in which:

DESCRIPTION OF PREFERRED EMBODIMENTS

Figure 1A:
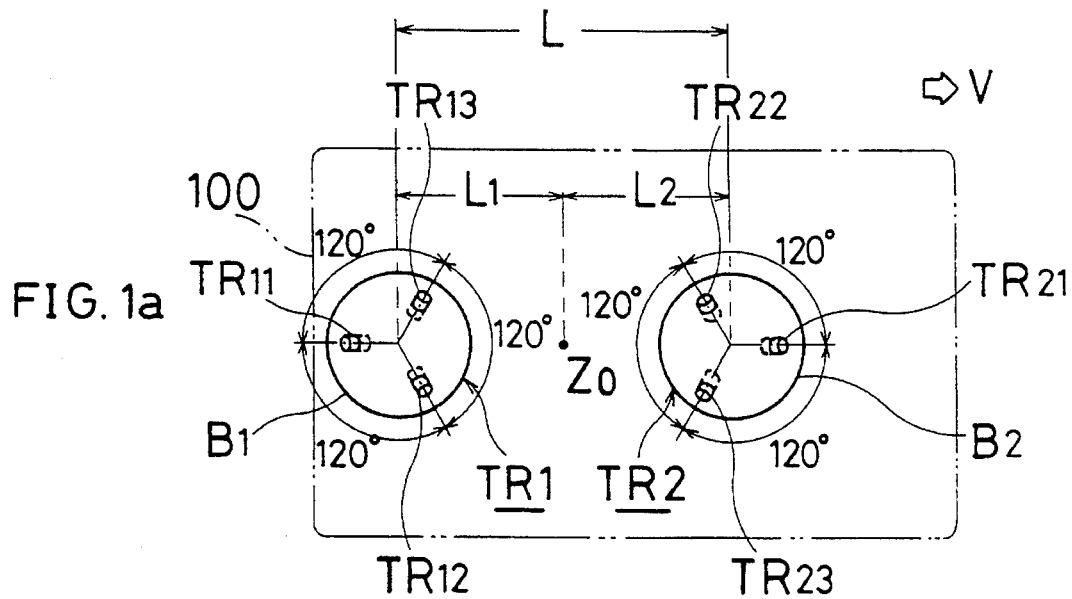
FIGS. 1(a), 1(b) and 1(c) are explanatory drawings each showing a fundamental theory of first and second ultrasonic transducing means each having three ultrasonic transducers in one embodiment of an ultrasonic measuring system of the invention.

Referring to the drawings, wherein like reference characters designate like or corresponding parts throughout the several views, one preferred mode of an ultrasonic measuring system of the invention will be described hereafter.

[FUNDAMENTAL THEORY]

Figure 1B:
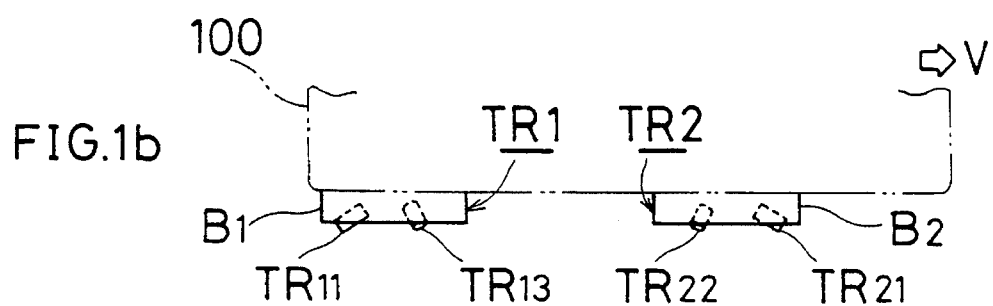
Figure 1C:
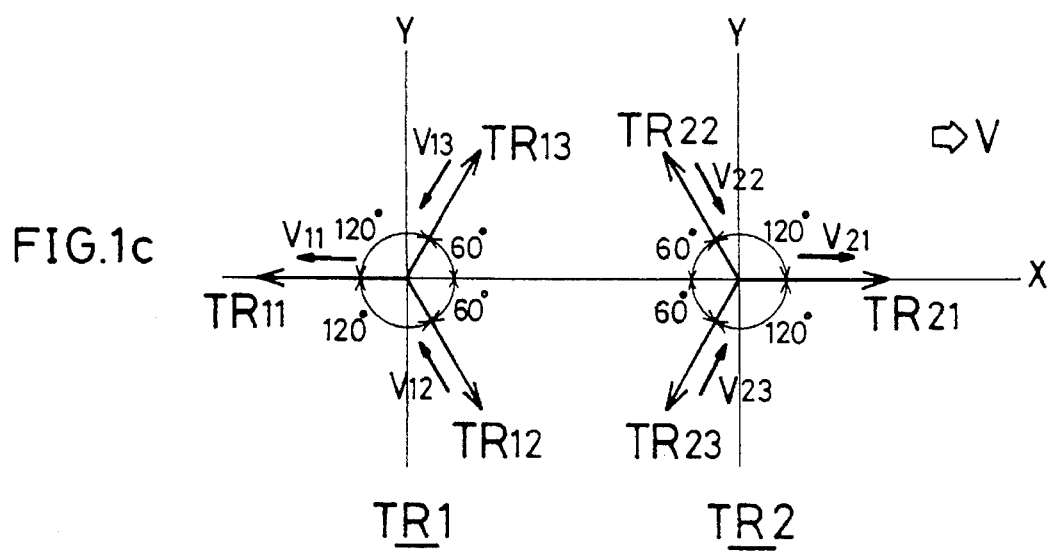
Figure 2:
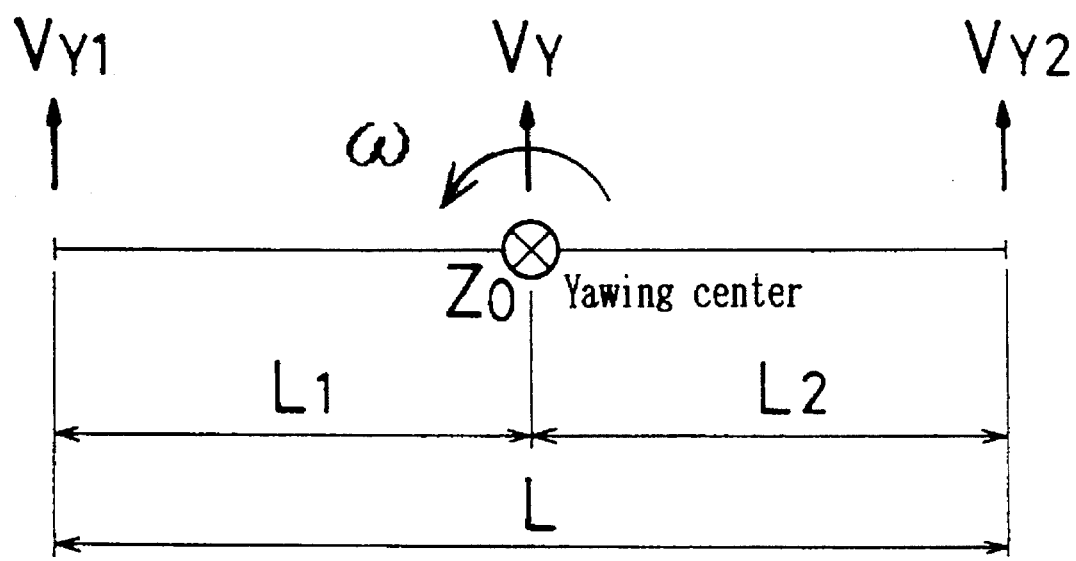
FIG. 2 is an explanatory drawing showing a relation between a yawing center and first and second ultrasonic transducing means.
Figure 3:
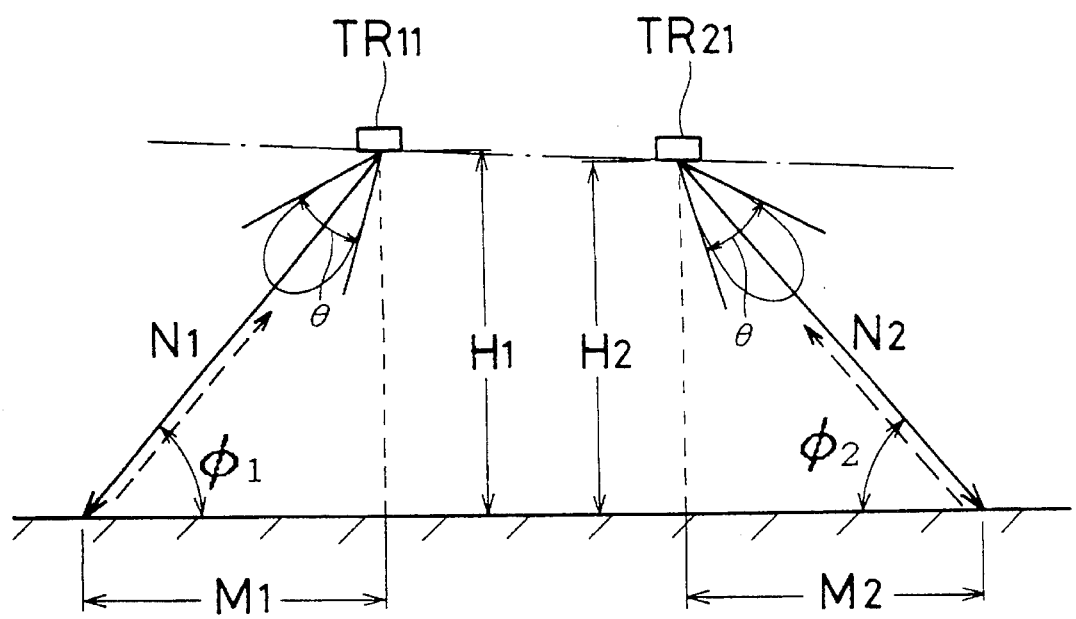
FIG. 3 is an explanatory drawing showing a fundamental theory in synthesizing opposite speed vectors in the first embodiment of an ultrasonic measuring system of the invention.

FIGS. 1(a), 1(b) and 1(c) respectively show a fundamental theory of first and second ultrasonic transducing means each having three ultrasonic transducers in a first embodiment of an ultrasonic measuring system of the invention. FIG. 2 shows an explanatory drawing of a relation between a yawing center and first and second ultrasonic transducing means in the first embodiment of an ultrasonic measuring system of the invention. FIG. 3 shows an explanatory drawing of a fundamental theory in synthesizing opposite speed vectors in the first embodiment of an ultrasonic measuring system of the invention.

Figure 13:
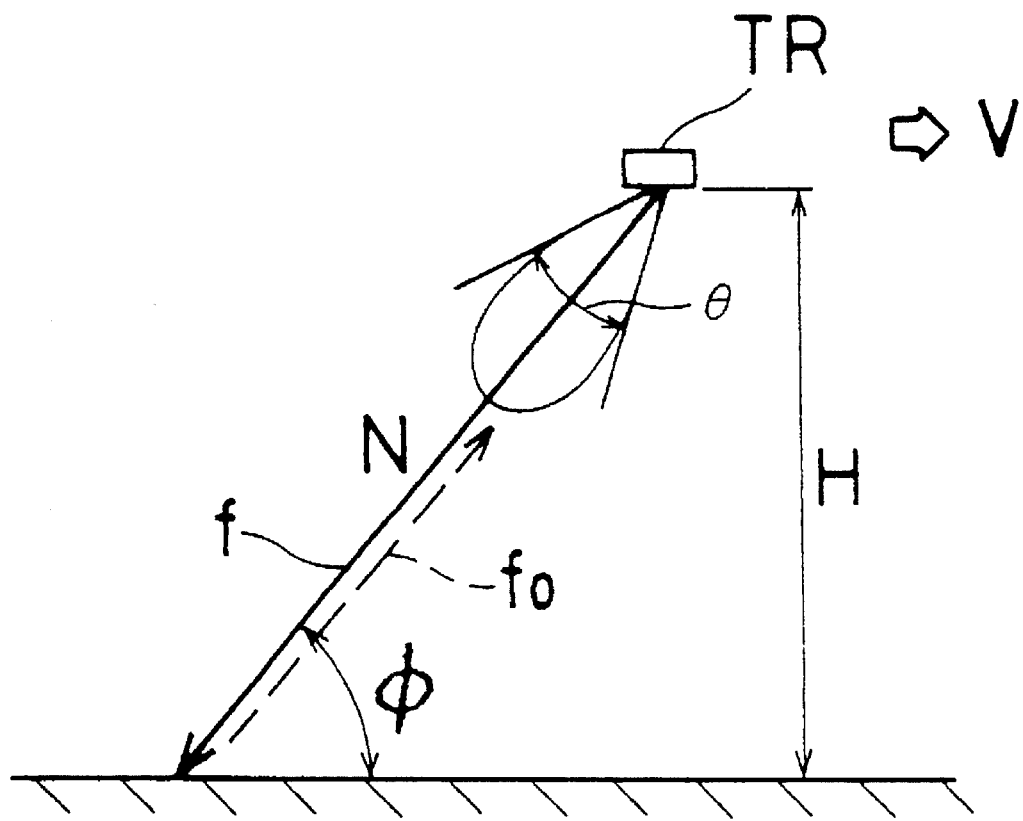
FIG. 13 is an explanatory drawing of a fundamental theory of a conventional ultrasonic measuring system that has one transducer for transmitting and receiving ultrasonic waves.

In the figures, an ultrasonic transducer TR11 is mounted on a vehicle 100 so that its ultrasonic wave advancing direction extends in parallel with a running direction of the vehicle 100 and at a down-angle of 45 degrees ($\phi1$ in FIG. 3) in relation to the running direction which is defined in a horizontal plane. The transducer TR11 generates ultrasonic vibrations of 200 [KHz] and transmits ultrasonic waves with a fixed width to a road surface, and receives reflected waves from the road surface. The transducer TR11 obtains a speed vector V11 that is parallel to the running direction of the vehicle 100. Illustratively, the ultrasonic transducer TR11 is disposed at a lateral center of a front of the vehicle 100, as shown in FIG. 1(a). An ultrasonic transducer TR12 possesses the same property or performance as the transducer TR11. The transducer TR12 is disposed on the vehicle 100 so as to transmit a fixed beam width of ultrasonic waves toward the road surface at a down-angle of 45 degrees and receive reflected waves from the road surface. As shown in FIGS. 1(a) and 1(c), the transducer TR12 is disposed with its ultrasonic wave advancing direction shifted at an angle of 120 degrees to the ultrasonic wave advancing direction of the transducer TR11, in plan view. The transducer TR12 obtains a speed vector V12. An ultrasonic transducer TR13 has the same property or performance as the transducer TR11, too. The transducer TR13 is also disposed on the vehicle 100 so as to transmit a fixed beam width of ultrasonic waves toward the road surface at a down-angle of 45 degrees and receive reflected waves from the road surface. Still, the transducer TR13 is disposed with its ultrasonic wave advancing direction shifted at an angle of −120 degrees to the ultrasonic wave advancing direction of the transducer TR11, in plan view, as shown in FIGS. 1(a) and 1(c). The transducer TR13 obtains a speed vector V13. These ultrasonic transducers TR11, TR12 and TR13 are embedded, illustratively partly by molding, in a synthetic resin base B1 so as to make one body. FIG. 13 is an explanatory drawing of a fundamental theory of a conventional ultrasonic measuring system that has one transducer for transmitting and receiving ultrasonic waves.

In the figures, an ultrasonic transducer TR21 is mounted on a vehicle 100 so that its ultrasonic wave advancing direction extends in parallel with and at a down-angle of 45 degrees ($\phi 2$ in FIG. 3) to a reverse direction to the running direction of the vehicle 100. The transducer TR21 generates ultrasonic vibrations of 200 [KHz] and transmits ultrasonic waves with a fixed width to a road surface, and receives reflected waves from the road surface. Thus, the transducer TR21 obtains a speed vector V21 that is reverse to the speed vector V11, as shown in FIG. 1(c). Illustratively, the ultrasonic transducer TR21 is disposed at a lateral center of a rear of the vehicle 100, as shown in FIGS. 1(a) and 1(b). An ultrasonic transducer TR22 possesses the same property or performance as the transducer TR12. The transducer TR22 is disposed on the vehicle 100 so as to transmit a fixed beam width of ultrasonic waves toward the road surface at a down-angle of 45 degrees and receive reflected waves from the road surface. As shown in FIGS. 1(a) and 1(c), the transducer TR22 is disposed with its ultrasonic wave advancing direction shifted at an angle of −120 degrees to the ultrasonic wave advancing direction of the transducer TR21, in plan view. The transducer TR22 obtains a speed vector V22 that is reverse to the speed vector V12, as shown in FIG. 1(c). An ultrasonic transducer TR23 has the same property or performance as the transducer TR13, too. The transducer TR23 is also disposed on the vehicle 100 so as to transmit a fixed beam width of ultrasonic waves toward the road surface at a down-angle of 45 degrees and receive reflected waves from the road surface. Still, the transducer TR23 is disposed with its ultrasonic wave advancing direction shifted at an angle of 120 degrees to the ultrasonic wave advancing direction of the transducer TR21, in plan view, as shown in FIGS. 1(a) and 1(c). The transducer TR23 obtains a speed vector V23 that is reverse to the speed vector V13, the plan view, as shown in FIG. 1(c). These ultrasonic transducers TR21, TR22 and TR23 are embedded, illustratively partly by molding, in a synthetic resin base B2 so as to make one body. As shown in FIG. 1(b), the bases B1 and B2 are attached to the lower surface of the vehicle body. Illustratively, each of the bases B1 and B2 has a disc plate shape in plan view, while arranging the transducers TR11, TR12 and TR13 or TR21, TR22 and TR23 along an outer circumference thereof, and their centers are aligned on the longitudinally extending center line of the vehicle 100 that is parallel to the running direction and passes the yawing center $Z_o$. Moreover, the centers of the bases B1 and B2 are spaced at a distance L.

To sum up, the transducers TR11, TR12 and TR13 of the first transducing means TR1 obtain the speed vectors V11, V12 and V13, and the transducers TR21, TR22 and TR23 of the second transducing means TR2 obtain the speed vectors V21, V22 and V23.

A speed vector Vx1 in the car running direction (longitudinal direction) and a speed vector Vy1 in a lateral direction perpendicular to the car running direction measured by the first ultrasonic transducing means TR1 are represented by the following expressions:

$$Vx1 = (-\tfrac{1}{2})\{(V11 + (V12 + V13)/4\} \tag{5}$$

$$Vy1 = (\sqrt{\phantom{-}}{}^{3}\!/_{4})\,(V12 - V13) \tag{6}$$

A speed vector Vx2 in the car running direction (longitudinal direction) and a speed vector Vy2 in a lateral direction perpendicular to the car running direction measured by the second ultrasonic transducing means TR2 are represented by the following expressions:

$$Vx2 = (\tfrac{1}{2})\{(v21 + V23)/4\} \tag{7}$$

$$Vy2 = (\sqrt{\phantom{-}}{}^{3}\!/_{4})\,(V23 - V22) \tag{8}$$

From the above expressions, a component of a translational motion of the vehicle 100 is represented by the following expressions:

$$Vx = (Vx1 + Vx2)/2 \tag{9}$$

$$Vy = (Vy1 + Vy2)/2 \tag{10}$$

With respect to the yawing center $Z_o$, if a distance L1 between the yawing center $Z_o$ and the first transducing means TR1 is L1 and a distance between the yawing center $Z_o$ and the second transducing means TR2 is L2, a relation between a yaw rate $\omega$ and each of the distances L1 and L2 is represented by the following expressions:

$$\omega L1 = -(Vy1 - Vy) \tag{11}$$

$$\omega L2 = -(Vy2 + Vy) \tag{12}$$

$$L1 + L2 = L \tag{13}$$

From the expression (11), $$L1 = (Vy - Vy1)/\omega \tag{14}$$

From the expression (12), $$L2 = (Vy2 - Vy)/\omega \tag{15}$$

Substituting the expressions (14) and (15) for the expression (13) and modifying them, the following expression is obtained:

$$L \cdot \omega = Vy2 - Vy1 \tag{16}$$

Accordingly, the yaw rate $\omega$ is represented by the following expression:

$$\omega = (Vy2 - Vy1)/L \tag{17}$$

Substituting the expression (17) for the expression (14), the yawing center $Z_o$ is at a position calculated by the following expression:

$$L1 = L \cdot (Vy - Vy1)/(Vy2 - Vy1) \tag{18}$$

As described above, the longitudinal speed component and the lateral speed component of the vehicle 100 are calculated from the expressions (9) and (10). These components are integrated and differentiated to obtain a distance and an acceleration. The yaw rate is computed from the expression (17) and the yawing center $Z_o$ is computed from the expression (18).

While, in the illustrated embodiment, the first and second transducing means TR1 and TR2 are disposed respectively at the front and rear bottoms of the vehicle at equal distances L1 and L2 from a perpendicular passing the yawing center $Z_o$, the invention may be practised in another way, as long as they are disposed at two positions among the front, rear and center of the vehicle 100 and separated from each other.

Figure 4:
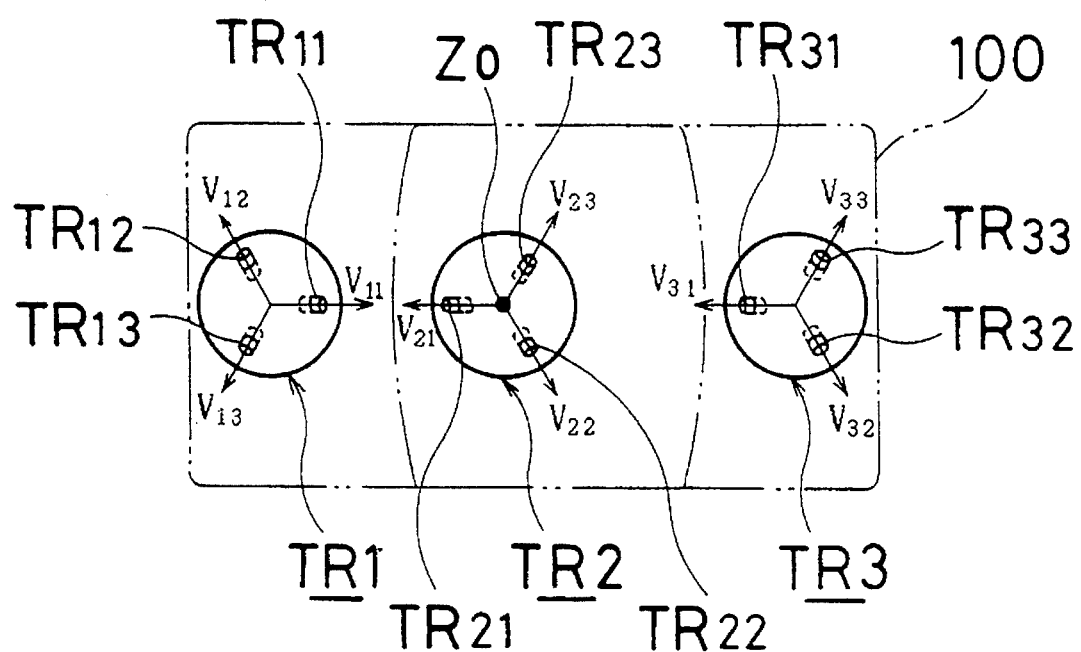
FIG. 4 is an explanatory drawing showing a fundamental theory of a modification of the first embodiment of an ultrasonic measuring system of the invention that has three ultrasonic transducing means.

FIG. 4 shows a modification of the first embodiment of an ultrasonic measuring system of the invention that has three ultrasonic transducing means.

Referring to FIG. 4, an ultrasonic measuring apparatus has first, second and third ultrasonic transducing means TR1, TR2 and TR3 arranged respectively at the front, center and rear of the vehicle 100. Each transducing means TR1, TR2, TR3 has the same structure as the first or second transducing means TR1, TR2 described above. Each transducer TR31, TR31, TR33 of the third transducing means TR3 has the same structure, functions and effects as those of the first embodiment, and their description is eliminated to avoid redundancy. This modification also makes it possible to obtain a yaw rate, a yawing center, etc., as in the above mentioned first embodiment. Here, any two positions among the front, center and rear may be chosen for mounting the transducing means, in order to achieve the functions and effects of the present invention. Moreover, the speed vectors may be any ones as long as they are directed oppositely to each other. As a matter of course, if the first transducing means TR1 is disposed at the front, the second transducing means TR2 is disposed at the center and the third transducing means TR3 is disposed at the rear, it is possible to correct the yawing center or detect any slip in the lateral direction of the vehicle 100, by use of the central second transducing means TR2.

Figure 5:
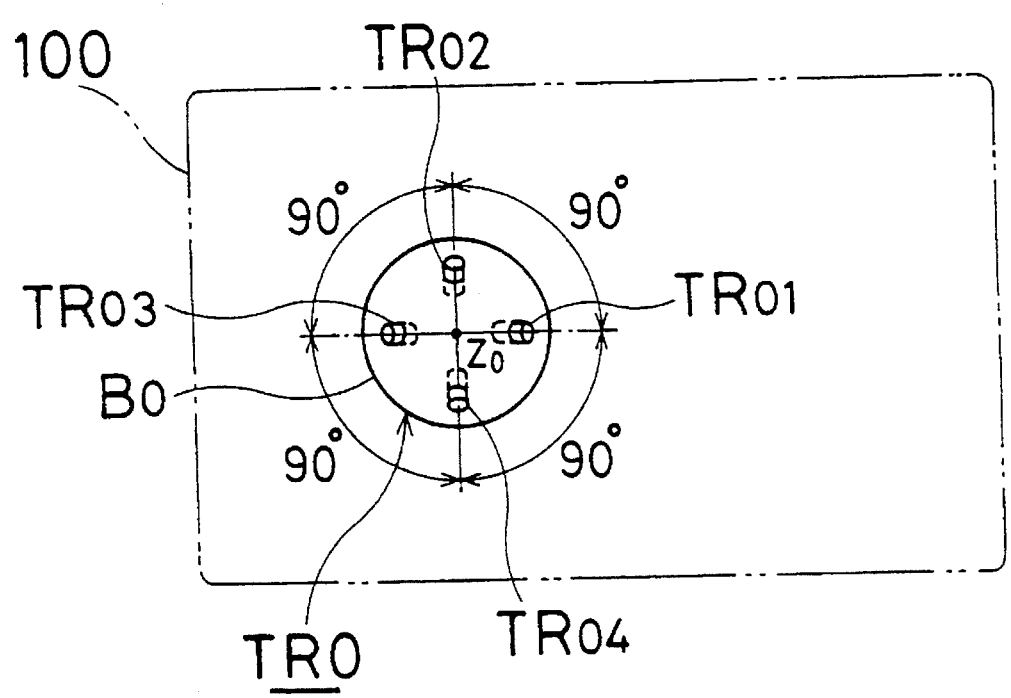
FIG. 5 is an explanatory drawing showing a fundamental theory of an ultrasonic transducing means TR0 having four ultrasonic transducers in a second embodiment of an ultrasonic measuring system of the invention.

FIG. 5 show a fundamental theory of an ultrasonic transducing means TR0 having four ultrasonic transducers in a second embodiment of an ultrasonic measuring system of the invention.

Referring to FIG. 5, an ultrasonic measuring apparatus of this embodiment has only one ultrasonic transducing means TR0. The transducing means TR0 has four ultrasonic transducers TR01, TR02, TR03 and TR04. Each transducer TR01, TR02, TR03, TR04 has the same structure, functions and effects as those of the first embodiment, and their description is eliminated to avoid redundancy. The first transducer TR01 is mounted on the vehicle body so that its ultrasonic wave direction accords with the backward running direction of the vehicle 100, while the third transducer TR03 is mounted on the vehicle body so that its ultrasonic wave direction accords with the forward running direction, in plan view. The second transducer TR02 is mounted on the vehicle body so that its ultrasonic wave direction accords with the rightward lateral direction of the vehicle 100, while the fourth transducer TR04 is mounted on the vehicle body so that its ultrasonic wave direction accords with the leftward lateral direction, in plan view. Thus, the transducers TR01, TR02, TR03 and TR04 are arranged at an angle of 90 degrees to each other. They are embedded in a synthetic resin molded base B0, as in the first embodiment.

The invention may be embodied in any form as long as it is capable of obtaining two dimensional speeds. Therefore, the transducing means TR0 may have another arrangements, as long as four ultrasonic transducers TR01, TR02, Tr03 and TR04 are disposed at an angle of 90 degrees to each other in a horizontal plane about a predetermined axis so as to radiate and receive the ultrasonic waves at a down-angle of 45 degrees to the road surface. For example, they are mounted to the vehicle body so as to radiate and receive the ultrasonic waves in other directions than the above, i.e. different directions from the longitudinal and lateral directions. In this case, similar advantageous effects can be achieved, by computing a difference of speed vectors of the first and third transducers TR1 and TR3 that are oppositely directed at an angle of 180 degrees, and a difference of speed vectors of the second and fourth transducers TR2 and TR4 that are also oppositely directed at an angle of 180 degrees.

[CIRCUITRY OF ILLUSTRATIVE EMBODIMENT]

Figure 6:
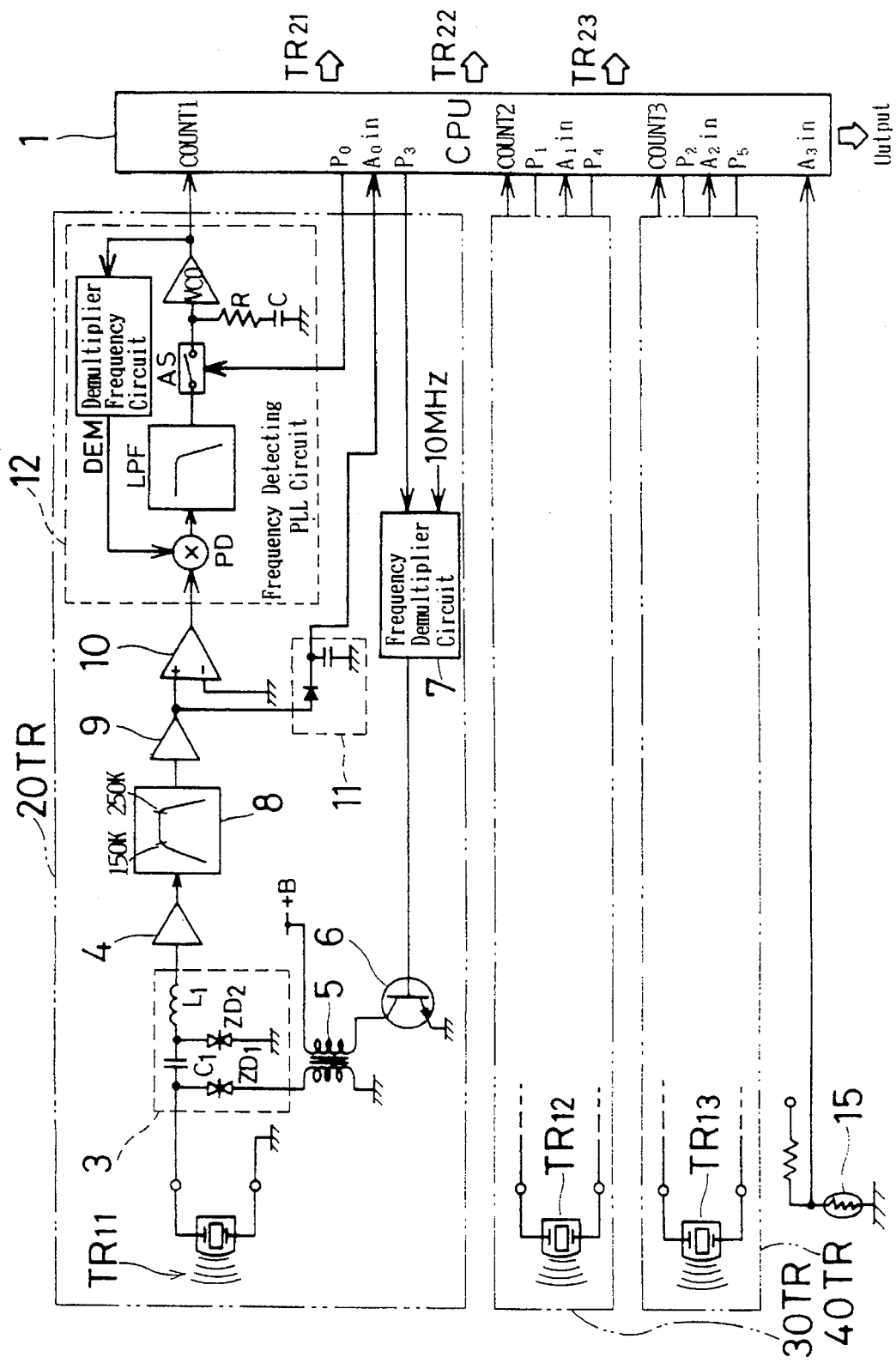
FIG. 6 is a circuit diagram of one embodiment of the ultrasonic measuring system of the invention.

FIG. 6 shows a circuitry used for each of the illustrative embodiments of the ultrasonic measuring system.

Referring to the figure, a microcomputer 1 has an A/D converter, a random access memory (RAM), a read only memory (ROM), an arithmetic and logic unit and the like provided therein. It is well-known to one skilled in the art and its functions will be described later. The transducer TR11 transmits and receives a fixed beam width of ultrasonic vibrations or waves of 200 [KHz]. A switching circuit 3 carries out a switching operation when the transducer TR11 outputs or inputs the ultrasonic vibrations. In the switching circuit 3, both of a Zener diode ZD1 and a Zener diode ZD2 are made ON in a transmitting operation, while both the Zener diodes ZD1 and ZD2 are made OFF in a receiving operation, thereby switching the transmitting and receiving operations.

The Zener diode ZD1 is serially connected with a secondary winding of a transformer 5. A primary winding of the transformer 5 is connected to a power source and supplies power via a switching transistor 6. A frequency multiplier circuit 7 is supplied with 10 [MHz] of an externally oscillated frequency output and outputs 200 [KHz] of rectangular waves into the switching transistor 6 so as to make the transistor 6 intermittently ON and OFF by the signals of 200 [KHz].

Accordingly, if the microcomputer 1 supplies "1" from an intermittent output P1, the switching transistor 6 is ON and OFF by the output of the frequency demultiplier circuit 7 thereby to generate a high voltage of 200 [KHz] at the secondary winding of the transformer 5. Thus, the transducer TR11 generates ultrasonic waves.

The signals of the transducer TR11 which are detected through the switching circuit 3 are amplified by the preamplifier 4. A band pass filter 8 passes only the signals corresponding to the reflected waves among the radiated waves. The passed signals are further amplified by an amplifier 9 and inputted into a comparator 10 to undergo binary processing. Part of inputs of the comparator 10 is inputted into a receiving level detecting circuit 11, and an output thereof is inputted into the A/D converter of the microcomputer 1.

Output signals of the comparator 10 is inputted into a frequency detecting PLL circuit 12. The PLL circuit 12 outputs a number of repetition pulses that are proportional to the output of the comparator 10.

More in detail, the output of the comparator 10 is sampled only for a receiving gate time when the receiving gate is open so that the PLL circuit 12 detects a frequency thereof. The PLL circuit 12 is used as a frequency multiplying circuit so as to obtain a resolution available for detecting a vehicle speed.

Specifically, a phase difference detecting circuit PD compares pulses from a frequency demultiplier circuit DEM, an output of which is demultiplied into one eighth, with the output from the comparator 10. The phase difference therebetween is transferred to an analog switching circuit AS through a low pass filter LPF. The output of the analog switching circuit AS is inputted into a resistor R and a condenser C for sample-and-hold processing and also into the microcomputer 1 through a voltage control oscillator circuit VCO. The output of the voltage control oscillator circuit VCO is demultiplied into one eighth by the frequency demultiplier circuit DEM and inputted into the phase difference detecting circuit PD through the frequency demultiplier circuit DEM. As a result, repetition pulses of eightfold frequency are inputted into the microcomputer 1 from the voltage control oscillator circuit VCO.

An outside air temperature is detected by a thermistor 15 and inputted into a terminal of the A/D converter contained in the microcomputer 1.

An ultrasonic transducer circuitry 20TR is constituted by a transmitting circuitry for ultrasonic waves and a receiving circuitry for the ultrasonic waves, the transmitting circuitry being composed of the ultrasonic transducer TR11, the switching circuit 3, the transformer 5, the switching transistor 6 and the frequency demultiplier circuit 7, and the receiving circuitry being composed of the ultrasonic transducer TR11, the switching circuit 3, the preamplifier 4, the band pass filter 8, the amplifier 9, the comparator 10, the receiving level detecting circuit 11 and the frequency demultiplier PLL circuit 12.

An ultrasonic transducer circuitry 30TR contains the ultrasonic transducer TR12 while an ultrasonic transducer circuitry 40TR contains the ultrasonic transducer TR13. They have the same circuitry as the transducer circuitry 20TR. The transducers TR11, TR12 and TR13 constitute the first ultrasonic transducing means TR1. The transducers TR21, TR22 and TR23 constitute the second ultrasonic transducing means TR2 and processed by the same circuitry as that of the first transducing means TR1. Their circuitries are not shown in detail to avoid redundancy.

Figure 7:
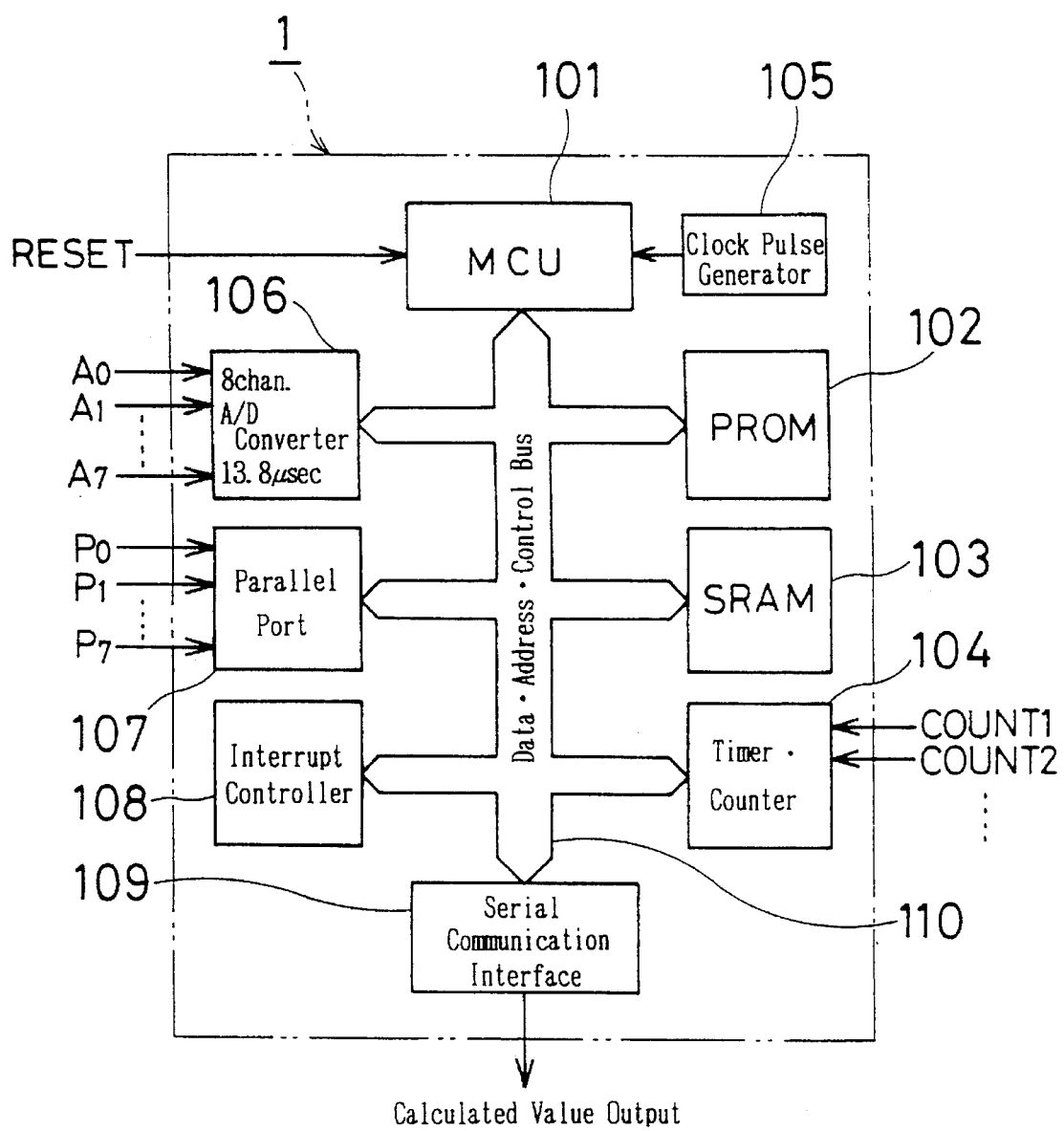
FIG. 7 is a block diagram of a microcomputer used in the circuitry of FIG. 6.

FIG. 7 illustrates function blocks of the microcomputer 1 used for the circuitry in each of the embodiments of the ultrasonic measuring system of the invention.

In the figure, the microcomputer 1 contains a main control unit (MCU) 101 which is driven by a clock pulse generator 105. The microcomputer 1 further contains a programmable read only memory (PROM), a static random access memory (SRAM) 103, a timer-counter 104, an A/D converter 106, a parallel port 107, an interrupt controller 108, a serial communication interface 109 and the like. The PROM 102 stores a program for controlling the operation of the microcomputer 1. The SRAM 103 stores data that the main control unit 101 needs in the control work. The timercounter 104 has a counting function as a timer and a counter. The A/D converter 106 provides external analog inputs of eight channels. The parallel port 107 provides external digital inputs. The interrupt controller 108 carries out an interruption control. The serial communication interface 109 serially outputs computed values of the vehicle speed. They are connected with each other through a data-address-control bus 110.

[GENERAL BASIC OPERATION OF CIRCUITRY]

The ultrasonic transducer circuitries 20TR, 30TR and 40TR operate as follows. Since the basic operation of each circuitry 20TR, 30TR, 40TR is the same, and the first and second transducing means TR1 and TR2 also have the same basic operation, the description will be made hereunder mainly with respect to the circuitry 20TR. Still, as a matter of course, the circuitries 30TR and 40TR and the second circuitry TR2, the details of which are eliminated, are controlled in common or independently in the same manner.

Gate signals are outputted from a terminal P1 of the parallel port 107 of the microcomputer 1 so that the transducers TR11, TR12 and TR13 transmit burst waves each having a frequency of 200 [KHz] and a duration of 1 [msec], at 10 [msec] intervals therefrom. The switching transistor 6 undergoes ON-OFF control by the outputs from the frequency demultiplier circuit 7 so as to generate ultrasonic waves from the transducers TR11, TR12 and TR13 by the boosted outputs of 200 [KHz]. Here, the switching circuit 3 is designed such that it does not apply an excessive signal to the input of the preamplifier 4 at the receiving side during the transmitting operation.

In this operation, the ultrasonic wave outputting work of the transducers TR11, TR12 and TR13 of the first transducing means TR1 and the transducers TR21, TR22 and TR23 of the second transducing means TR2 may be performed at the same time or by time division. In the illustrative embodiment, the ultrasonic waves are outputted simultaneously from the transducers TR11, TR12 and TR13 of the first transducing means TR1 and the transducers TR21, TR22 and TR23 of the second transducing means TR2, since it has few possibility of mutual intervention and is less affected by such a position change of the vehicle 100 as up-and-down movements or nose-up and nose-down movements.

Each of the transducers TR11 (of the first and second transducing means TR1 and TR2) receives the reflected waves from the road surface. The received signals are amplified approximately to 80 [dB] through the preamplifier 4. The amplified signals enter the band pass filter 8 and only the signals of approximately 200±50 [KHz] are passed therethrough. The passed signals are further amplified by the amplifier 9 and made binary by the comparator 10. Then, the binary signals are inputted into the frequency detecting PLL circuit 12 to obtain a frequency of the reflected waves from the road surface. The signals outputted from the comparator 10 are sampled and held through the PLL circuit 12 only during the time when a predefined reflected waves from the road surface are detected. A predefined detected frequency of the reflected waves is held by holding that voltage. The output signals of the voltage control oscillating circuit VCO are demultiplied into one eighth and fed back to the phase difference detecting circuit PD so as to be locked in a frequency eight times as frequent as that of the reflected waves that are inputted into the transducers TR11 (of the first and second transducing means TR1 and TR2). Accordingly, if the output signals from the voltage control oscillating circuit VCO are counted by the counter in the microcomputer 1, a Doppler frequency is measured on the basis of the frequencies of the radiated waves and the reflected waves. In this embodiment, a resolution of about 0.5 [Km/h] or more is obtained in terms of the vehicle speed.

[MAIN CONTROL OPERATION BY MICROCOMPUTER]

Figure 8:
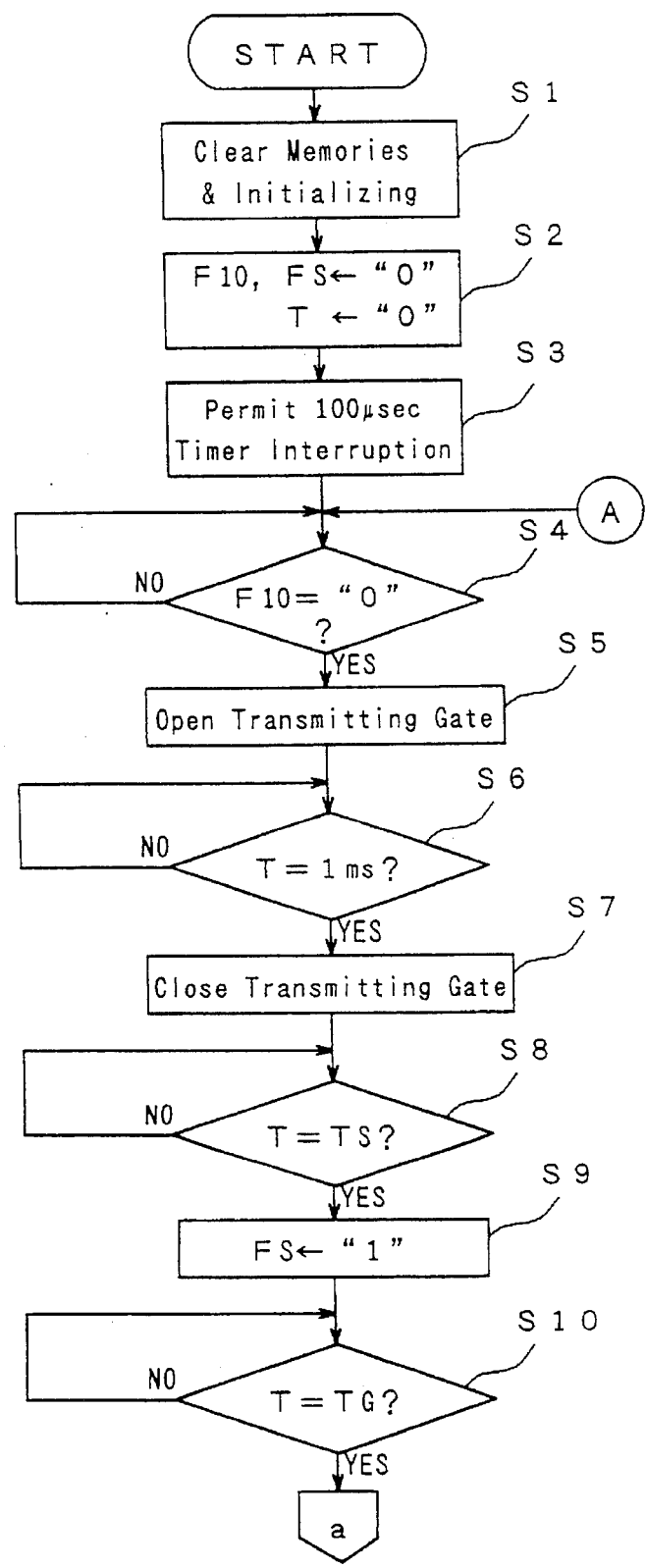
FIG. 8 is a flowchart showing part of a main program executed by the microcomputer of FIG. 7.
Figure 9:
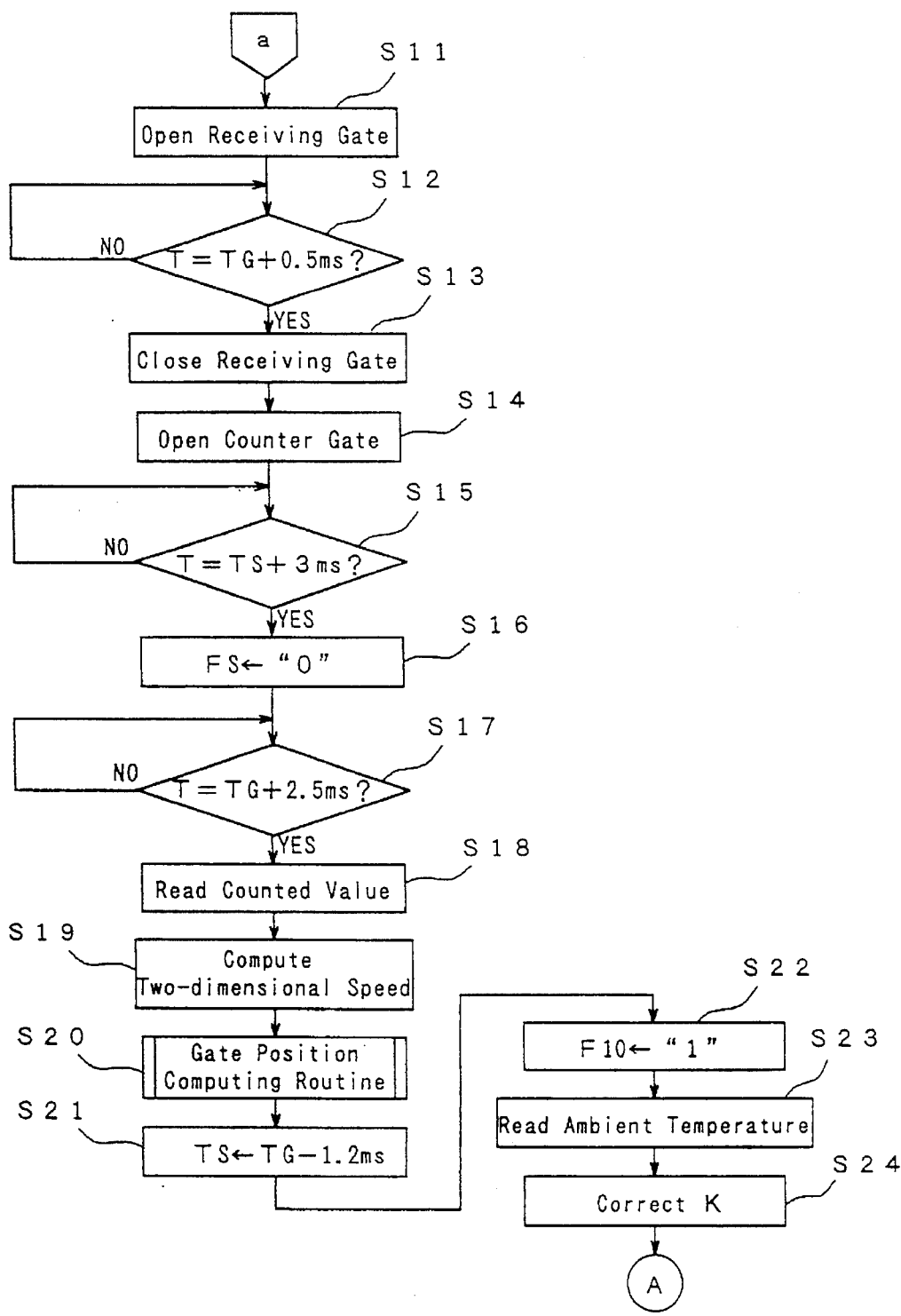
FIG. 9 is a flowchart of showing another part of the main program executed by the microcomputer of FIG. 7.
Figure 10:
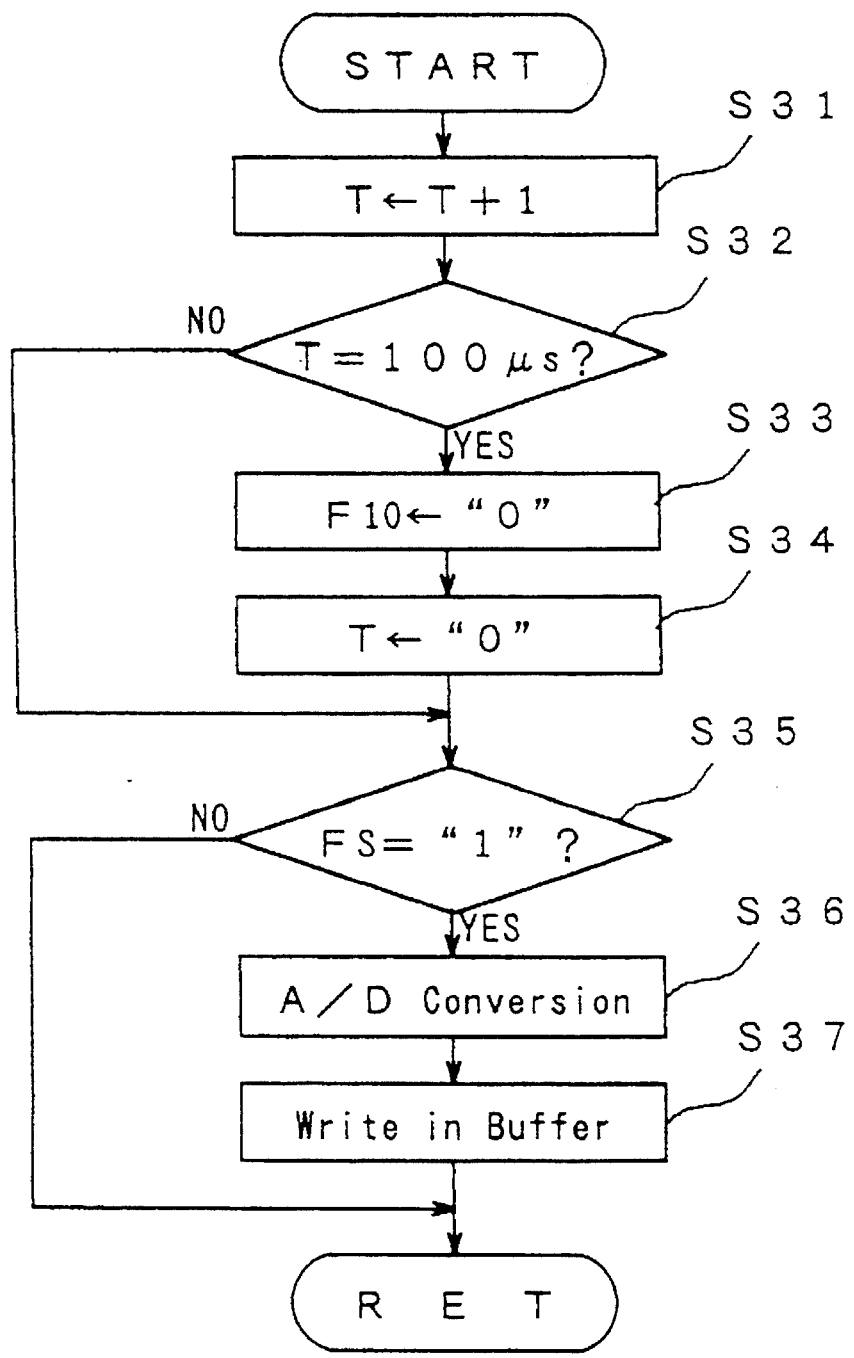
FIG. 10 is a flowchart showing an interruption routine executed by the microcomputer of FIG. 3.
Figure 11:
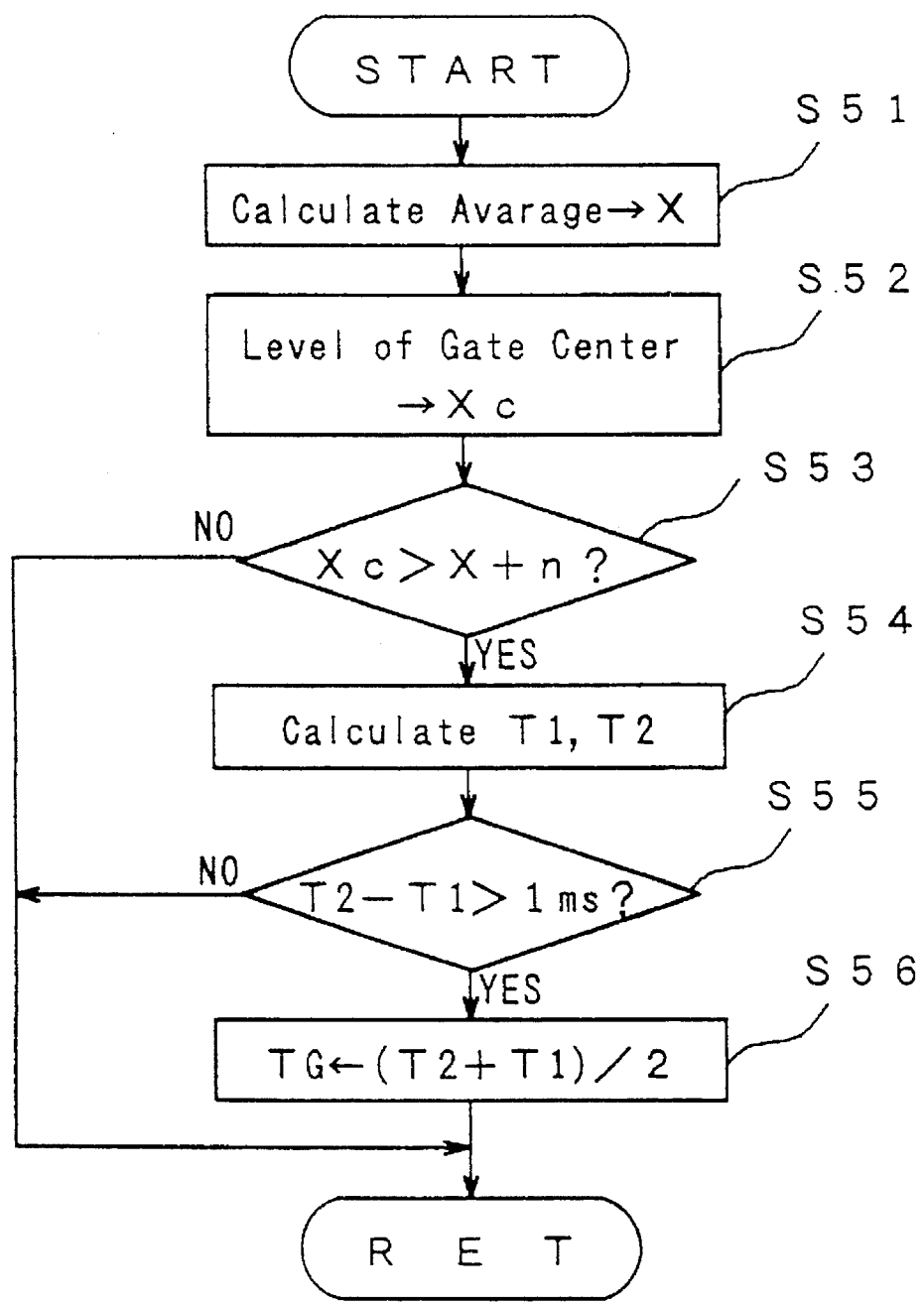
FIG. 11 is a flowchart showing a gate position control routine executed by the microcomputer of FIG. 3.

FIGS. 8 and 9 show, in combination, a flowchart of a main program executed by the microcomputer 1 of the embodiments of the ultrasonic measuring system of the invention. FIG. 10 is a flowchart of an interruption routine executed by the microcomputer 1. FIG. 11 is a flowchart of a gate position control executed by the microcomputer 1.

Figure 12:
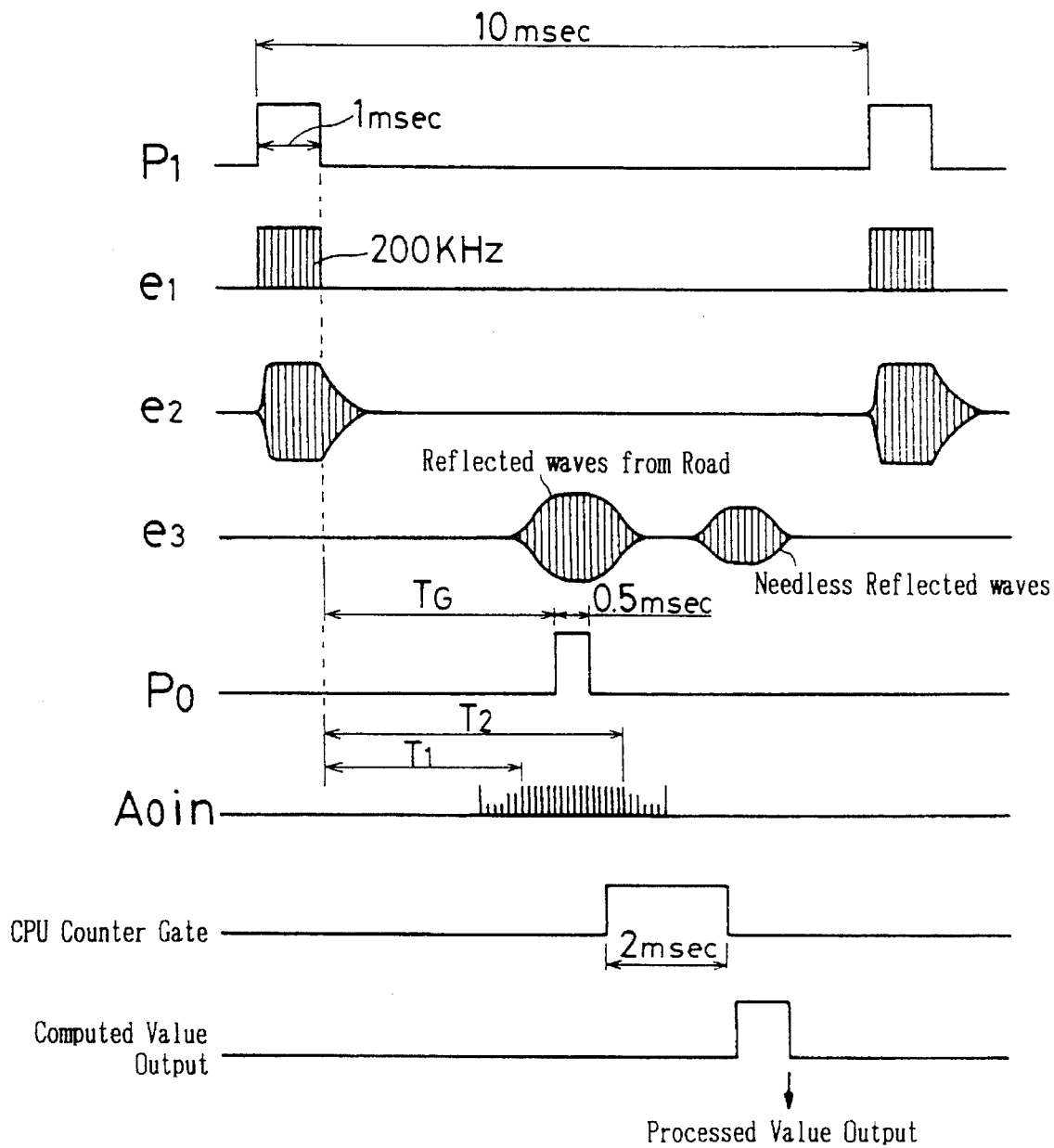
FIG. 12 is a timing chart of the gate position control routine of FIG. 11.

FIG. 12 is a timing chart in the control operation of the illustrated embodiment of the ultrasonic measuring system of the invention. Basic operations of the transducer circuitries 20TR, 30TR and 40TR are the same in the first and second transducing means TR1 and TR2, so the control operation of the transducer circuitry 20TR will be mainly described hereunder. However, as a matter of course, the transducer circuitries 30TR and 40TR in the first and second transducing means TR1 and TR2 are controlled in the same manner.

If a power supply is made ON, a power-on reset circuit is operated to input a reset pulse in the main control circuit 101. Then, the main control circuit 101 is resetted and starts the main program processing of FIGS. 8 and 9 which is stored in the PROM 102.

Entering the main program, execution first proceeds to a step S1. This step S1 clears or sets into a predetermined value a variety of memories, counter and timer used for the transducer circuitries 20TR, 30TR and 40TR of the first and second transducing means TR1 and TR2, and initializes each of the output ports and the like. Particularly, the step S1 sets a receiving gate start time TG and a sampling start time Ts. The step S1 sets, for this receiving gate start time TG, a receiving time of the ultrasonic wave signals corresponding to a mounting height of the transducing means TR1 and TR2 on the vehicle 100 in a standard state as a predefined value. For example, if the mounting height is 250 [mm], the radiation angle of the ultrasonic waves is 45 degrees, and the sound speed C equals 345 [m/s], the receiving gate start time TG is set as follows:

$$TG = 2 \times 0.28 / \sin 45 \times 1/345 + 0.3 = 2.6 \text{ [msec]}$$

where: 0.3 [msec] is added so as to set the position of a receiving gate width 0.5 [msec], corresponding to a transmitted wave pulse width 1 [msec], approximately at a center of the received wave.

Then, execution proceeds to a step S2. The step S2 clears a 10 msec sequence ending flag F10 that determines an ending of a 10 msec sequence, a sampling permitting flag Fs and a main timer T. Execution proceeds to a step S3 thereafter, and the step S3 permits 100 μsec timer interruption which carries out interruptions every 100 [μsec]. Execution then proceeds to a step S4, and the step S4 determines if the 10 msec sequence ending flag F10 is taken down or not. The step S4 stands by until the 10 msec sequence ending flag F10 is taken down, and executes following processing every 10 [msec]. If the 10 msec sequence ending flag F10 is taken down, the step S4 routes execution to a step S5 via its YES path. The step S5 switches on the switching transistor 6 to open the transmitting gates of the transducer circuitries 20TR, 30TR and 40R. Execution then proceeds to a step S6, and the step S6 determines if 1 msec has elapsed or not through the main timer T. If the 1 msec has elapsed, the step S6 routes execution, via its YES path, to a step S7. The step S7 closes the transmitting gates of the transducer circuitries 20TR, 30TR and 40TR of the first and second transducing means TR1 and TR2. Then, 1 [msec] of ultrasonic burst signal is outputted. Namely, as shown in FIG. 8, the steps S4 to S7 execute the opening of the transmitting gate in response to "1" signals each of which has a duration of 1 [msec] and which are repeatedly generated every 10 [msec] from the output terminal P1 of the microcomputer 1. The burst signals are generated during that time as shown by outputs e1 of the frequency demultiplier circuit 7, and the transmitting wave inputs of the first and second transducing means TR1 and TR2 are as shown by outputs e2. The reflected waves have outputs as shown by e3 through the transducers TR11 and the like of the first and second transducing means TR1 and TR2.

During the steps S1 to S7, the transducer circuitries 20TR, 30TR and 40TR of the first and second transducing means TR1 and TR2 are simultaneously controlled in case of transmitting the ultrasonic waves. After these steps, the transducer circuitries 20TR, 30TR and 40TR of the first and second transducing means TR1 and TR2 are individually controlled. Still, in this illustrative embodiments, description of the common matters will be eliminated in order to avoid complication.

When execution proceeds to a step S8, this step S8 determines if the predicted sampling start time Ts has come or not for inputting the reflected waves into each of the transducer circuitries 20TR (of the first transducing means TR1 and the second transducing means TR2). If the sampling start time Ts has come, the step S8 routes execution, via its YES path, to a step S9, The step S9 puts up the sampling permitting flag Fs. Execution then proceeds to a step S10, and the step S10 determines if each of the receiving gate start time TG, which are-obtained by the initialized value or in the gate position computing routine, has come or not. If each of the receiving gate start time TG has come, the step S10 routes execution, via its YES path, to a step S11. The step S11 opens the receiving gate of the transducer circuitries 20TR (of the first and second transducing means TR1 and TR2). Execution then proceeds to a step S12, and the step S12 makes the receiving gate ON only for 0.5 [msec]. Thereafter, execution proceeds to a step S13, and the step S13 makes the receiving gate OFF and enters an execution of a step S14. Namely, the steps S8 to S13 determine if the receiving gate start time TG of each transducer circuitry 20TR of the transducing means TR1, TR2 has come or not, and opens and closes the receiving gate, that passes the reflected ultrasonic waves, for each transducer circuitry 20TR of the transducing means TR1, TR2.

Execution then proceeds to a step S14, and the step S14 opens a gate of a counter COUNT1 (COUNT2, COUNT3, - - - ) contained in the main control circuit 101. Thereafter, execution proceeds to a step S15, and the step S15 determines if 3 [msec] has elapsed from the sampling start time TS or not. Namely, in response to the sampling start time Ts, signals from each transducer circuitry 20TR (of the transducing means TR1, TR2) are inputted into a terminal A0in (A1in, A2in, - - - ) of the A/D converter contained in the microcomputer 1 for ±1.5 [msec] from the center of ON-time of the receiving gate, and sampling of the inputted signals is executed. If 3 [msec] has elapsed from each sampling start time Ts, the step S15 routes execution, via its YES path, to a step S16. The step S16 takes down the sampling permitting flag Fs. Execution then proceeds to a step S17, and the step S17 determines through the main timer T if ON-time of the counter has a duration of 2.5 msec from the receiving gate start time TG for each transducer circuitry 20TR (of the transducing means TR1, TR2) or not. If the ON-time of the counter has a duration of 2.5 msec, the step S17 routes execution, via its YES path, to a step S18. The step S18 reads a counted value of the counter and closes the gate of the counter. Execution then proceeds to a step S19, and the step S19 performs a computing operation of a two-dimensional speed and the like.

In computing the two dimensional speed, speed vectors of every directions are obtained from the speed vectors in three directions of the first transducing means TR1 (speed vectors V11, V12 and V13) and the speed vectors in three directions of the second transducing means TR2 (speed vectors V21, V22 and V23) by the expressions (5) and (6) and the expressions (7) and (8).

Here, magnitudes of the speed vectors V11, V12, V13, V21, V22 and V23 are expressed as follows:

$$V11 = K \cdot countX1$$

$$V12 = K \cdot countX2$$

$$V13 = K \cdot countX3$$

$$V21 = K \cdot countX4$$

$V22 = K \cdot countX5$ $V23 = K \cdot countX6$ wherein: each of "countX1, countX2, countX3, countX4, countX5, countX6" is a counted value of the counter, and "K" is a coefficient determined by the ambient temperature. Thus, each speed vector can be obtained, and the two dimensional speed is computed by use of the expressions (5) to (8) and the like. Moreover, it is possible to compute distances and accelerations and calculate the lateral speed Vy and the yaw rate ω of the vehicle 100, the centrifugal force applied to the vehicle 100, etc., by integrating and differentiating these speed vectors. As a matter of course, it is possible to compute a rotating speed (yaw rate ω) about a vertical axis passing the gravity center and a centrifugal force applied to a passenger.

Execution then proceeds to a step S20, and the step S20 calls the gate position computing routine. Execution then proceeds to a step S21, and the step S21 sets a sampling time for a sampling start time Ts at a time point of 1.2 [msec] prior to a receiving gate start time TG. Namely, the gate position computing routine determines a next receiving gate start time TG. Execution then proceeds to a step S22, and the step S22 puts up a 10 msec sequence ending flag F10. Thereafter, execution proceeds to a step S23, and the step S23 reads the ambient temperature. Then, execution proceeds to a step S24, and the step S24 corrects and determines a proportional constant K used in a next calculating operation of the vehicle speed. Thereafter, the routine from the step S4 to the step S24 is repeated.

[TIMER INTERRUPTING OPERATION OF MICROCOMPUTER]

Upon entry into this routine, execution proceeds to a step S31, and the step S31 increases "+1" for the main timer T. Execution then proceeds to a step S32, and the step S32 determines through the main timer T if now is the time for interruptions, which are carried out every 100 [μsec], or not. If the step S23 determines that the current time is the interruption time, this step S23 routes execution, via its YES path, to a step S33 and a step S34. The step S34 takes down the 10 msec sequence ending flag F10, which determines an end of the 10 [msec] of sequence, and clears the main timer T. If the step S32 determines that the current time is not the interruption time, the step S32 avoids the steps S33 and S34, and routes execution, via its NO path, to a step S35.

The step S35 determines if the sampling permitting flag Fs is put up or not. If the sampling permitting flag Fs is put up, the step S35 routes execution, via its YES path, to a step S36. The step S36 begins A/D conversion through outputs of the receiving level detecting circuit 11. Execution then proceeds to a step S37, and the step S37 writes the converted digital data into a buffer and this routine is exited. If the step S35 determines that the sampling permitting flag Fs is not put up, this routine is also exited.

Namely, in this routine, a signal level is sampled through the signal level detecting circuit 11 at 0.1 [msec] intervals using the main timer T, and that signal level is stored in the buffer contained in the main control circuit 101.

[GATE POSITION CONTROL OPERATION OF MICROCOMPUTER]

The number of the received signal level data that have been sampled by the interrupting sampling at 0.1 [msec] intervals is 31 in total, namely, 15 sample data respectively before and after the center sample data. Upon entry in this routine, as shown in FIG. 11, execution proceeds to a step S51, and the step S51 calculates an average X by simply averaging all the level data. Execution then proceeds to a step S52, and the step S52 stores a level value of the center sample data of the received signal level data into a center sample data memory Xc. Execution then proceeds to a step S53, and the step S53 determines if the stored level value Xc of the center sample data (and the level value of the 15 level data respectively provided at before and after the center data) is larger than a value of a predefined average X added with a predetermined amount n. If the step S53 determines that the level value Xc of the center sample data and the level value of the 15 level data respectively provided before and after the center data are larger than the value X+n, it means the data in which desired waves are reflected in good order, so that execution proceeds to a step S54 so as to accept these data. However, if the step S53 determines that the level value Xc of the center sample data and the level value of the 15 level data respectively provided before and after the center data are not larger than the value X+n, it means that the data in which the received wave form is distorted due to random interference, so that this routine is exited via a NO path of the step S53 so as to prevent these data from being accepted. The step S53 routes execution, via its YES path, to a step S54, and the step S54 searches a time period of data that exceed the value of the average X of all the level data added with the predetermined amount n, thereby obtaining a previous time T1 and an after time R2. Execution then proceeds to a step S55, and the step S55 determines if the amplitude T2–T1 is more than 1 [msec] and covers sufficiently the time for obtaining the received signal level data or not. This is also for preventing acceptance of data in which the received wave form has been distorted due to random interference. The step S55 routes execution, via its YES path, to a step S56, and the step S56 sets the time (T2+T1)/2 as the receiving gate start time TG. If the amplitude T2–T1 is not larger than 1 [msec] and does not sufficiently cover the time for obtaining the received signal level data, this step is exited via a NO path of the step S55.

As described above, the inventive ultrasonic measuring system has the transducers TR11, TR12 and TR13 of the first transducing means TR1 and the transducers TR21, TR22 and TR23 of the second transducing means TR2, while making opposite the ultrasonic wave radiating and reflecting directions between the transducers TR11, TR12 and TR13 of the first transducing means TR1 and the transducers TR21, TR22 and TR23 of the second transducing means TR2. Moreover, the inventive ultrasonic measuring system has a computing means constituted by the step S19 for computing the two dimensional speed from the speed vectors in three directions of the first transducing means TR1 and the speed vectors in three directions, which correspond to the speed vectors of the first transducing means TR1, of the second transducing means TR2.

Accordingly, the inventive ultrasonic measuring system can lessen the influences of vehicle height change due to vertical vibrations, nose-up and nose-down movements of the vehicle, and obtain the speed vector in the running direction of the vehicle 100 and each average speed vector that is shifted to the running direction speed vector at an angle of ±120 degrees. These average speed vectors may be synthesized to obtain a first component in the running direction of the vehicle 100 and a second component that is perpendicular to the first component of the two dimensional speed. The longitudinal speed Vx in the running direction of the vehicle 100 and the lateral speed Vy perpendicular thereto can be obtained by these two dimensional speed components. Moreover, with these data, the distance and the acceleration can be computed by integrating and differentiating the speed vectors, and the yawing center $Z_o$ and the yaw rate ω can be obtained, too. Furthermore, it is possible to compute the angular velocity about the vertical axis passing the gravity center and the angular acceleration by differentiating the angular velocity. In addition, it is possible to trace a locus thereof or compute the centrifugal force applied to the passengers.

As a result, by use of thus obtained speed components, the inventive ultrasonic measuring system can be applied to a measuring or control system that uses a variety of speed information: such as a navigation system that corrects a moving distance and a moving direction, a speed detecting system for a vehicle speed and a lateral speed and the like, a side slip preventing system, an antilock brake system (ABS) that corrects a yaw rate or rotation difference between the right and left wheels, a suspension system that corrects a yaw rate or adjusts a height between the road at right and left wheels and the vehicle, etc.

Particularly, the above embodiments of the ultrasonic measuring system locate the first and second ultrasonic transducing means TR1 and TR2 forwardly and rearwardly of the yawing center Zo which has a predetermined range of movement. Accordingly, it is possible to detect the vectors of the rotating movements at both sides of the yawing center $Z_o$ in case of rotating the wheels. Moreover, the vectors are opposite to each other, so that the yawing center $Z_o$ can be precisely obtained.

While the first embodiments have the first and second ultrasonic transducing means TR1 and TR2 each composed of three ultrasonic transducers, the invention may be embodied in another form, e.g. in the form that has the ultrasonic transducing means TR0 composed of four ultrasonic transducers, as in the second embodiment.

This embodiment can achieve the same advantageous effects as the first embodiment. Moreover, this system needs only four ultrasonic transducers, while the first embodiment needs six ultrasonic transducers in total. Therefore, it can lessen the number of ultrasonic transducers by two, and eliminate a corresponding circuit for processing signals from the two transducers. As a result, the system can be cheaper. Still, the same advantageous effects can be obtained as the first embodiment, and it never deteriorates the quality by decreasing the number of component parts.

The vehicle speed is detected by the ultrasonic transducers TR11 and TR21 or TR01 and TR03 in the illustrative embodiments. However, since the sound speed is not so fast as to be ignored relative to the vehicle speed, there arises a shift between a beam in transmitting waves and a beam in receiving waves in case of narrowing the width of the ultrasonic wave in order to raise a total gain of the transmitting and receiving waves. Therefore, reflected waves may be received by an ultrasonic transducer for measuring a speed at the time of low speed driving or an ultrasonic transducer for measuring a speed at the time of high speed driving. Moreover, the ultrasonic transducer circuitries 20TR, 30TR and 40TR may be respectively provided with two ultrasonic transducers, or half of the ultrasonic transducers may be used exclusively for receiving the ultrasonic waves. Particularly, the transducer circuitry 20TR, for detecting the speed parallel to the running direction of the vehicle 100, may be two ultrasonic transducers or a combination of one ultrasonic transducer and one ultrasonic receiver, and a receiving position for the reflected waves may be changed according to the vehicle speed. In this case, a measured speed has a high accuracy and reliability.

In the illustrative embodiments, the transducers TR11 and TR21 or the transducers TR01 and TR03 are mounted on the vehicle 100 in accordance with the running direction. However, since the speed is computed by synthesizing the vectors, the vehicle speed can be detected by synthesizing the vectors of the running direction component and the lateral component perpendicular thereto of the two dimensional speed, even if any mounting directions of the transducers do not accord with the running direction. Still, in case the transducers TR11 and TR21 or the transducers TR01 and TR03 are mounted on the vehicle 100 in accordance with the running direction as in the illustrative embodiments, the computing speed of the two dimensional speed by synthesizing the vectors is faster.

While the above embodiments are described with respect to the vehicle speed measurement, the ultrasonic measuring system of this invention may be applied, by use of speed components, to any type of measuring or control system that uses a variety of speed information: such as a navigation system, speed detecting system, side slip preventing system, antilock brake system, suspension system, etc.

The preferred embodiments described herein are therefore illustrative and not restrictive, the scope of the invention being indicated in the appended claims and all variations which come within the meaning of the claims are intended to be embraced therein.

What is claimed is:

1. An ultrasonic measuring apparatus for a vehicle comprising a first ultrasonic transducing means including first, second and third ultrasonic transducers disposed at 120° intervals in a horizontal plane about a first vertical axis disposed adjacent a front end of the vehicle, each of said first, second and third ultrasonic transducers transmitting ultrasonic waves to a road surface at a down-angle relative to the road surface and receiving reflected waves from the road surface;

a second ultrasonic transducing means including fourth, fifth and sixth ultrasonic transducers disposed at 120° intervals in a horizontal plane about a vertical axis disposed adjacent a rear of the vehicle, each of said fourth, fifth and sixth transducers transmitting ultrasonic waves to a road surface at a down-angle relative to the road surface and receiving reflected waves from the road surface;

said first transducer and said fourth transducer sending and receiving ultrasonic waves in directions 180° apart, said second transducer and said fifth transducer sending and receiving ultrasonic waves in directions 180° apart and said third transducer and said sixth transducer sending and receiving waves in directions 180° apart; and computing means for computing three first speed vectors in three first directions obtained by said first ultrasonic transducing means and computing three second speed vectors in three second directions corresponding to the three first directions obtained by said second ultrasonic transducing means and computing a two-dimensional speed by synthesizing said first and second speed vectors.

2. An ultrasonic measuring apparatus according to claim 1, wherein said first ultrasonic transducing means and said second ultrasonic transducing means are disposed forwardly and rearwardly of a moving range for a yawing center of a vehicle, respectively.

3. An ultrasonic measuring apparatus according to claim 2, comprising third ultrasonic transducing means disposed between said first and second transducing means.

4. An ultrasonic measuring apparatus according to claim 1, wherein the computing means computes a yaw rate on the basis of said two dimensional speed and a distance between said vertical axis of the first transducing means and the vertical axis of the second transducing means.

5. An ultrasonic measuring apparatus according to claim 1, wherein the computing means computes a yaw center on the basis of said two dimensional speed in a distance between said vertical axis of the first transducing means and said vertical axis of the second transducing means.

6. An ultrasonic measuring apparatus according to claim 1, wherein said first and fourth transducers are disposed in alignment with a running direction of the vehicle.

7. An ultrasonic measuring apparatus for a vehicle comprising an ultrasonic transducing means including first, second, third and fourth ultrasonic transducers disposed at 90° intervals in a horizontal plane about a vertical axis wherein said first and third transducers are disposed to transmit ultrasonic waves in directions 180° apart and wherein said second transducer and said fourth transducers are disposed to transmit ultrasonic waves in directions 180° apart and to receive reflected ultrasonic waves in directions 180° apart; and computing means for computing a two dimensional speed by computing speed vectors in two directions obtained by two of the transducers separated at an angle of 180° and synthesizing the speed vectors to obtain a two dimensional speed.

8. An ultrasonic measuring apparatus according to claim 7, wherein said first and third transducers are disposed in alignment with a running direction of the vehicle.

* * * * *